United States Patent [19]
Liman et al.

[11] Patent Number: 5,416,130
[45] Date of Patent: May 16, 1995

[54] PROCESS FOR THE PRODUCTION OF POLYURETHANE FOAMS

[75] Inventors: Ulrich Liman, Langenfeld; Heinz Eickhaus, Kürten; Gerd Steinert, Leverkusen, all of Germany

[73] Assignee: Bayer Aktiengesellschaft, Leverkusen, Germany

[21] Appl. No.: 206,784

[22] Filed: Mar. 4, 1994

[30] Foreign Application Priority Data

Mar. 25, 1993 [DE] Germany ............... 43 09 689.1

[51] Int. Cl.$^6$ ............... C08G 8/04; C08G 18/16
[52] U.S. Cl. ............... 521/125; 521/113; 521/128; 521/130; 521/163
[58] Field of Search ........... 521/125, 163, 113, 130, 521/128

[56] References Cited

U.S. PATENT DOCUMENTS

| | | | |
|---|---|---|---|
| 4,868,043 | 9/1989 | Eling et al. | 428/304.4 |
| 5,132,333 | 7/1992 | Burkhart et al. | 521/117 |
| 5,162,382 | 11/1992 | Carswell et al. | 521/51 |

FOREIGN PATENT DOCUMENTS

| | | |
|---|---|---|
| 417366 | 4/1992 | European Pat. Off. |
| 2238242 | 2/1974 | Germany . |
| 105816 | 5/1974 | Germany . |
| 4218840 | 12/1993 | Germany . |
| 4232420 | 3/1994 | Germany . |

Primary Examiner—Morton Foelak
Attorney, Agent, or Firm—Joseph C. Gil

[57] ABSTRACT

A process for the production of polyurethane foams, in particular for the production of composite articles by back-foaming a plastics film as covering layer by the reaction of a) one or more polyisocyanates with
b) a polyol component which is free from salt groups in the presence of
c) at least one blowing agent,
d) alkali metal carboxylates and
e) from 0.01 to 30% by weight, based upon the weight of component b), of one or more organic compounds which are different from components a) through d), which are free from tertiary amino groups, metal and phosphorus and which have a dipole moment above 2.0 Debye.

9 Claims, No Drawings

PROCESS FOR THE PRODUCTION OF POLYURETHANE FOAMS

BACKGROUND OF THE INVENTION

The present invention relates to a new process for the production of water-blown polyurethane foams from known starting materials and alkali metal salts of organic carboxylic acids as catalysts as well as special additives which substantially increase the compatibility of these catalysts with the other starting materials. The process is suitable in particular for the production of composite articles by back foaming plastics with such reaction mixtures. The invention also relates to the composite articles obtainable by this process.

Water-blown foams (and in particular, those which are used for so-called back foaming processes) from a reaction mixture which reacts to form a flexible or semi-rigid polyurethane foam, are of great technical importance and are used, for example, on a large commercial scale for the internal fittings of motor vehicles and aircraft and for the production of upholstered furniture. In the back-foaming process, a foamable reaction mixture is applied to a covering layer (typically, a thermoplastic film) which has been placed in a suitable mold and is allowed to foam against that layer. For most of these applications it is important that the foams, apart from having good mechanical properties, should have little or no influence on heat aging of the top layer. In addition, the raw materials used should have a constant reactivity even after prolonged storage.

The tertiary amines frequently used as catalysts in the reaction mixtures have the disadvantage of leading to poor heat resistance of the foams. It has already been attempted to replace these amines, for example, by alkali metal salts of carboxylic acids such as potassium acetate. Using these catalysts as the only catalysts has, however, the disadvantage that the time required inside the mold is too long or (in the case of high catalyst concentrations) the cream times are too short. In addition, the use of such alkali metal salts entails the problem that an irreversible exudation of salts is observed, in particular when there are fluctuations in the temperature during storage and transport of the polyol components, and this constitutes a very serious practical problem. The use of organic tin compounds as catalysts is frequently unsatisfactory due to the hydrolysis stability, which renders a constant activation over a prolonged period of storage impossible in polyol components which contain water.

German Patent 4,029,081 recommends the use of salts of hydroxycarboxylic acids which are soluble at room temperature in the usual polyol components but separate at temperatures above 40° C., and form an insoluble ground sediment after cooling to room temperature.

U.S. Pat. No. 4,868,043 recommends the use of an alkali metal or alkaline earth metal salts of carboxylic acids. The acids are produced from (i) carboxylic acid anhydrides and (ii) alcohols which are free from ether groups. Preferred acids are produced from carboxylic acid anhydrides and long chain diols. The last mentioned catalysts which are preferred according to the prior publication have, however, the disadvantage that due to their monofunctionality in isocyanate addition reactions they lead to chain terminating reactions and hence frequently to difficulty in working up the reaction mixture and to foams with inferior mechanical properties. The carboxylic acids free from hydroxyl and ether groups, which according to the prior publication do not belong to the preferred catalysts, have an unsatisfactory compatibility with the other reactants. Lastly, common to both types of catalysts of the prior publication is that their use results in reaction mixtures which do not yet optimally meet the requirements in practice as regards the relationship between a desired long cream time and a desired short mold release time.

Our own earlier German Patent Applications P 42 18 840.7 and P 42 32 420.3 recommend the use of alkali metal salts of carboxylic acid esters containing at least two hydroxyl groups per molecule or carboxylic acid esters which are substantially or virtually free from hydroxyl groups as catalysts to overcome these difficulties.

DESCRIPTION OF THE INVENTION

It has now surprisingly been found, however, that the problems noted above can easily be solved in an optimum manner by using the additives of the present invention which are described below. The additives not only bring about a very considerable increase in the compatibility even of simple alkali metal carboxylates with the usual polyether polyols but at the same time increase the catalytic action of these salts in the isocyanate polyaddition reaction.

The invention relates to a process for the production of polyurethane foams by the reaction of:
a) one or more polyisocyanates with
b) a polyol component which is free from salt groups in the presence of
c) at least one blowing agent,
d) alkali metal carboxylates and
e) from 0.01 to 30% by weight, based upon the weight of component b), of one or more organic compounds which are different from components a) through d), which are free from tertiary amino groups, metal and phosphorus and which have a dipole moment above 2.0 Debye,
f) optionally, in the presence of auxiliary agents and additives.

The invention in particular also relates to the production of composite articles by back-foaming a plastics film as top layer with a reaction mixture of the type described above which reacts to form a polyurethane foam. Finally, the invention also relates to the composite articles thus obtained.

The polyisocyanate component a) to be used in the process according to the invention may be any di- or polyisocyanate, and, in particular, those containing aromatically bound isocyanate groups. 2,4-diisocyanatotoluene, mixtures thereof with 2,6-diisocyanotoluene (TDI) and in particular polyisocyanate mixtures of the diphenylmethane series (MDI) which are liquid at room temperature are preferably used. Of particular preference are polyisocyanate mixtures obtained by the phosgenation of aniline formaldehyde condensates or distillation fractions or distillation residues prepared from such phosgenation products or modification products of such polyisocyanates or polyisocyanate mixtures of the diphenylmethane series containing urethane, carbodiimide and/or uretdione groups. The preferred polyisocyanate mixtures of the diphenylmethane series, which are optionally chemically modified, generally have an isocyanate group content of about 25 to 33% by weight.

Component b) consists in particular of polyether polyols or mixtures of polyether polyols having molecular weights (average) of from 400 to 12,000, preferably from 2000 to 6000, calculated from the hydroxyl group content and the hydroxyl functionality, and hydroxyl functionalities (average) of from 2 to 8, preferably 2 to 4, or mixtures of such polyether polyols with polyhydric alcohols having molecular weights below 400 which may be used in a quantity of up to 25% by weight, based on the weight of the polyether polyols.

Suitable polyether polyols are those of known type obtainable in known manner by the alkoxylation of suitable starter molecules. Examples of suitable starter molecules are: ethylene glycol, propylene glycol, trimethylolpropane, glycerol, sorbitol, pentaerythritol and sucrose and any mixtures of such polyhydric alcohols. Polyether polyols obtained by the alkoxylation of trifunctional starter molecules, in particular of trimethylolpropane and/or glycerol, are particularly preferred. The alkylene oxides used for the alkoxylation reaction may in particular be propylene oxide or ethylene oxide or mixtures of these two alkylene oxides. The alkylene oxides may be put successively into the alkoxylation reaction. Other polyols which are suitable in principle for use as component b) are described, for example, in European Patent Application 380,993.

Low molecular weight polyhydric alcohols having molecular weights below 400, (e.g. ethylene glycol, propylene glycol, diethylene glycol, dipropylene glycol, glycerol, trimethylolpropane or mixtures thereof) may also be used as component b) in quantities of up to 25% by weight, based upon the weight of the polyether polyols.

Component c) is preferably water but other blowing agents, for example halogenated hydrocarbons such as trifluorochloromethane, fluorinated hydrocarbons and readily volatile organic solvents such as pentane, acetone or diethylether may also be used. The use of such blowing agents in addition to water is, however, less preferred.

When water is used as the blowing agent, it is generally used in quantities of from 0.05 to 10% by weight, based on the weight of component b).

The catalysts d) are alkali metal salts of organic carboxylic acids. The catalysts d) are generally used in quantities of from 0.1 to 10% by weight, based on the weight of component b). Preferred catalysts d) are the sodium and potassium salts, in particular the potassium salts, of carboxylic acids in the molecular weight range of from 46 to 500 which are free from ether and ester groups. They may contain amino groups. Examples include the sodium or potassium salts of acetic acid, propionic acid, oxalic acid, malonic acid, malic acid, succinic acid, fumaric acid, acrylic acid, methacrylic acid, tartaric acid, maleic acid, fumaric acid, salicylic acid, glutaric acid, benzoic acid, glycine, alanine, valine, leucine, methionine, serine, threonine, tyrosine, asparagine, glutamine, cystein, lysine, arginine, histidine, aspartic acid, glutamic acid, isoleucine, phenylalanine, proline or citric acid.

In addition to these simple alkali metal salts, component d) may consist partly or completely of other alkali metal salts of carboxylic acids, for example, the alkali metal salts of carboxylic acids containing ester and/or ether groups as described in U.S. Pat. No. 4,868,043, and German Patent Applications P 42 32 420.3 and P 42 18 840.7.

The additives e) of the present invention are polar organic compounds with dipole moments of more than 2.0 Debye, which are free from tertiary amino groups, metal and phosphorous, and which are preferably soluble in the usual polyether polyols. These compounds preferably have molecular weights of from 58 to 500. Suitable compounds of this type are, for example, urea, thiourea, guanidine, N,N'-di-methyl-urea, tetraethylurea, N(n-propyl)-urea, formaldehyde, acetone, nitrobenzene, acetonitrile or mixtures of such highly polar compounds.

The additives e) according to the invention are used in quantities of from 0.01 to 30% by weight, based on the weight of component b). Particularly preferred additives e) are urea, guanidine and acetone. The first two compounds mentioned are generally used in quantities of from 0.01 to 5% by weight and acetone in quantities of from 1.0 to 30% by weight, based on the weight of component b).

Other auxiliary agents and additives f) optionally used include, for example, the classic polyurethane catalysts such as triethylenediamine, bis-(2-dimethylaminoethyl)-ether, N,N-dimethylethanolamine, N,N,N',N'',N''-pentaethyl-diethylenetriamine, N-methylmorpholine, dimethyl benzylamine, tertiary alkylphosphines, tin(II)octoate, dibutyl tin-(IV)-dilaurate and chelates of metals, e.g. chelates of the acetylacetonate of magnesium, zirconium or nickel. The addition of such further catalysts is by no means preferred. They are used, if at all, in quantities of at most 5% by weight, based on the weight of component b).

Other auxiliary agents and additives f) optionally used include, for example, the known additives such as flame retardants, fillers, pigments, plasticizers, antistatic agents and cell regulators.

In the process according to the invention, the above-mentioned starting materials are reacted together in proportions corresponding to an isocyanate index (number of isocyanate groups divided by the number of isocyanate reactive groups, multiplied by 100) of from 50 to 140. Components b) to e) are generally mixed to form a "polyol component" which is then reacted with the polyisocyanate component by the usual methods of polyurethane foam production.

The process according to the invention is suitable for the production of any foams. The products produced by the process according to the invention are, however, preferably flexible or semirigid polyurethane foams (compression resistance from 20 to 400 KPa at 40% deformation) having gross densities of 30 to 500, and preferably 70 to 200 kg/m$^3$. The foams can be used in known manner for back foaming plastics films for the production of composite film products for upholstery purposes or the internal fittings of motor vehicles, aircraft or ships (dashboards, internal facings of doors, armrests, headrests and the like).

Plastics films suitable for use in the back foaming process may be any covering layers which have hitherto been used for the production of composite film materials by back foaming plastics films with polyurethane foams. Examples include films of polyvinyl chloride (PVC), polyurethane, polymer blends of PVC and ABS, and thermoplastic polyolefins.

The process according to the invention is preferably carried out by at least partly lining the internal walls of a mold with the plastics film which is to be back foamed and then filling the mold with the foamable mixture. The films used for the internal lining of the mold may be preformed in known manner, using the known technique of deep drawing or by using the known "Powder-Slush" process.

The quantity of foamable mixture introduced into the mold is generally calculated to produce foams having gross densities of from 30 to 500, preferably from 70 to 200 kg/m³.

The process according to the invention described above is also applicable to the production of substantially any polyurethane foam for which water is used as blowing agent.

The invention is further illustrated but is not intended to be limited by the following examples in which all parts and percentages are by weight unless otherwise specified.

EXAMPLES

Polyol components

100 Parts by weight of a polyether polyol with OH number 28 prepared by the propoxylation of trimethylolpropane followed by ethoxylation of the propoxylation product (PO:EO ratio by weight=85:15) were mixed with the quantities of alkali metal salt shown in Table 1 dissolved in 2.3 parts by weight of water. The quantities of urea also shown in Table 1 were then added. In Tables 2 and 3, for the rows entitled "60° C.", the polyol components were heated to 60° C. for 16 hours. The cloudy mixtures were cooled to room temperature (23° C.±3° C.) without stirring and the homogeneity was assessed after a further 24 hours by observing whether a cloudiness or a ground sediment persists. The reactivity test described below was always carried out at room temperature.

Polyisocyanate component

The polyisocyanate was a mixture of the diphenylmethane series having a viscosity at 23° C. of 200 mPa.s and an isocyanate group content of 32% by weight.

Production of the foams was carried out by the method in which the polyol component was first stirred for 30 seconds (stirring speed 1000 revs/min). The polyisocyanate component was then added and stirring was continued at room temperature for a further 10 seconds. The isocyanate index was 100 in all the Examples.

The reactivity of the polyol component was determined in parallel tests by the cream time, rise time and gel time. In samples which had a ground sediment without cloudiness, the quantity required for foaming was removed from the upright container from above. The cream time was then the time which elapsed from the addition of polyisocyanate to the onset of foaming; the rise time was the time which elapsed from the moment of addition of the polyisocyanate to termination of foaming; the gel time was the time which elapsed from the moment of addition of the polyisocyanate until the product was tack-free. Further details may be seen from Tables 2 and 3 below. The data obtained show in particular the co-catalytic activity and the increase in compatibility provided by additive e) (urea) according to the invention.

TABLE 1

Dependence of solubility of potassium acetate in 100 parts by weight polyether upon the urea concentration

| Urea concentration,pbw | 0 | 0.2 | 0.5 | 1.0 |
| --- | --- | --- | --- | --- |
| 0.2 pbw KAc | − | + | + | + |
| 0.25 pbw KAc | − | + | + | + |
| 0.3 pbw KAc | − | − | + | + |
| 0.4 pbw KAc | − | − | + | + |

− = insoluble
+ = soluble
pbw = parts by weight

TABLE 2

Reactivity of the polyol component with 0.4 pbw of KAc and 0 pbw of urea at different storage temperatures.

| | after 16 h | | |
| --- | --- | --- | --- |
| Polyol storage temperature | Cream time ±2 sec | Rise time ±3 sec | Gel time ±5 sec |
| RT* | 17 sec | 115 sec | 145 sec |
| 60° C.** | 20 sec | 130 sec | 170 sec |

*Sample shows no cloudiness after storage
**Sample shows heavy cloudiness after storage

TABLE 3

Reactivity of the polyol component with 0.4% KAc and 1.0% urea after 16 hours storage at room temperature and 60° C., respectively.

| Polyol storage temperature | Cream time ±2 sec | Rise time ±3 sec | Gel time ±5 sec |
| --- | --- | --- | --- |
| RT | 15 sec | 77 sec | 90 sec |
| 60° C.*** | 16 sec | 79 sec | 93 sec |

***Sample shows slight cloudiness after storage

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a polyurethane foam comprising reacting
   a) one or more polyisocyanates with
   b) a polyol component which is free from salt groups in the presence of
   c) at least one blowing agent,
   d) an alkali metal carboxylate and
   e) from 0.01 to 30% by weight, based upon the weight of component b), of one or more organic compounds which are different from components a) through d), which are free from tertiary amino groups, metal and phosphorus and which have a dipole moment above 2.0 Debye.

2. The process of claim 1, wherein component a) comprises a polyisocyanate mixture of the diphenylmethane series which is liquid at room temperature and which optionally contain urethanes, carbodiimide and/or uretdione groups.

3. The process of claim 1, wherein component b) comprises a polyether polyol or mixture of polyether polyols having hydroxyl functionalities (average) of 2 to 4 with molecular weights of from 400 to 12,000 or mixtures of such polyether polyols with up to 25% by weight, based on the weight of the polyether polyols, of dihydric and/or trihydric alcohols having molecular weights below 400.

4. The process of claim 1, wherein component c) is water.

5. The process of claim 1, wherein component d) comprises a sodium or potassium salt of an organic carboxylic acid having a molecular weight of from 46 to 500 and which is free from ether and ester groups, and is used in a quantity of from 0.1 to 10% by weight, based on the weight of component b).

6. The process of claim 5, wherein potassium acetate is used as component d).

7. The process of claim 1, wherein component e) is urea.

8. In a process for the production of composite articles by back foaming a plastics film as covering layer with a reaction mixture which reacts to form a polyurethane foam, the improvement wherein said reaction mixture comprises:

a) one or more polyisocyanates,
b) a polyol component which is free from salt groups,
c) at least one blowing agent,
d) alkali metal carboxylates and
e) from 0.01 to 30% by weight, based upon the weight of component b), of one or more organic compounds which are different from components a) through d), which are free from tertiary amino groups, metal and phosphorus and which have a dipole moment above 2.0 Debye.

9. Composite articles produced by the process of claim 8.

* * * * *